(12) United States Patent
Gavillet

(10) Patent No.: US 8,649,490 B2
(45) Date of Patent: Feb. 11, 2014

(54) REMOTE DIAGNOSIS OF BEVERAGE PREPARATION MACHINES

(75) Inventor: Gilles Gavillet, Ursy (CH)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/508,461

(22) PCT Filed: Nov. 4, 2010

(86) PCT No.: PCT/EP2010/066768
§ 371 (c)(1),
(2), (4) Date: May 7, 2012

(87) PCT Pub. No.: WO2011/054889
PCT Pub. Date: May 12, 2011

(65) Prior Publication Data
US 2012/0230482 A1    Sep. 13, 2012

(30) Foreign Application Priority Data

Nov. 5, 2009 (EP) ..................... 09175091

(51) Int. Cl.
*H04M 3/42* (2006.01)
*H04M 11/00* (2006.01)
*H04M 1/56* (2006.01)
*H04M 15/06* (2006.01)

(52) U.S. Cl.
USPC ............. 379/201.01; 379/93.01; 379/142.13; 379/142.15

(58) Field of Classification Search
USPC ............. 379/93.01, 100.02, 100.09, 102.01, 379/142.13, 201.01, 281, 353, 373.05; 455/420

See application file for complete search history.

(56) References Cited

U.S. PATENT DOCUMENTS

| 5,714,741 | A | * | 2/1998 | Pieterse et al. | 235/380 |
| 6,804,536 | B1 | * | 10/2004 | Bultman | 455/557 |
| 7,835,942 | B1 | * | 11/2010 | Pavlic et al. | 705/16 |
| 8,155,289 | B2 | * | 4/2012 | Kitagawa | 379/102.01 |
| 2002/0106073 | A1 | * | 8/2002 | Tevlin | 379/354 |
| 2006/0270452 | A1 | * | 11/2006 | Gerzberg | 455/557 |
| 2009/0156193 | A1 | * | 6/2009 | Urbanija et al. | 455/420 |

FOREIGN PATENT DOCUMENTS

| EP | 1302138 | 4/2003 |
| EP | 2085000 | 8/2009 |
| WO | 2004036509 | 4/2004 |
| WO | 2007022788 | 3/2007 |
| WO | WO 2007/022788 A1 * | 3/2007 |

* cited by examiner

*Primary Examiner* — Khai N Nguyen
(74) *Attorney, Agent, or Firm* — K&L Gates LLP

(57) ABSTRACT

A communication system (1) comprises: a beverage preparation machine (10) having a data-exchange communication module (11, 11'); a service unit (30) that is distant from the beverage preparation machine and that is arranged for exchanging data with the communication module of the beverage preparation machine; a transmission arrangement (15, 20, 35) for transmitting data between the data-exchange communication module and the service unit. The data-exchange communication module of the beverage preparation machine comprises a sound-interface (11, 11') for exchanging data as a sound signal. The transmission arrangement comprises a telephone device (15) for transmitting this sound signal of the data towards the service unit and/or originating from the service unit.

19 Claims, 1 Drawing Sheet

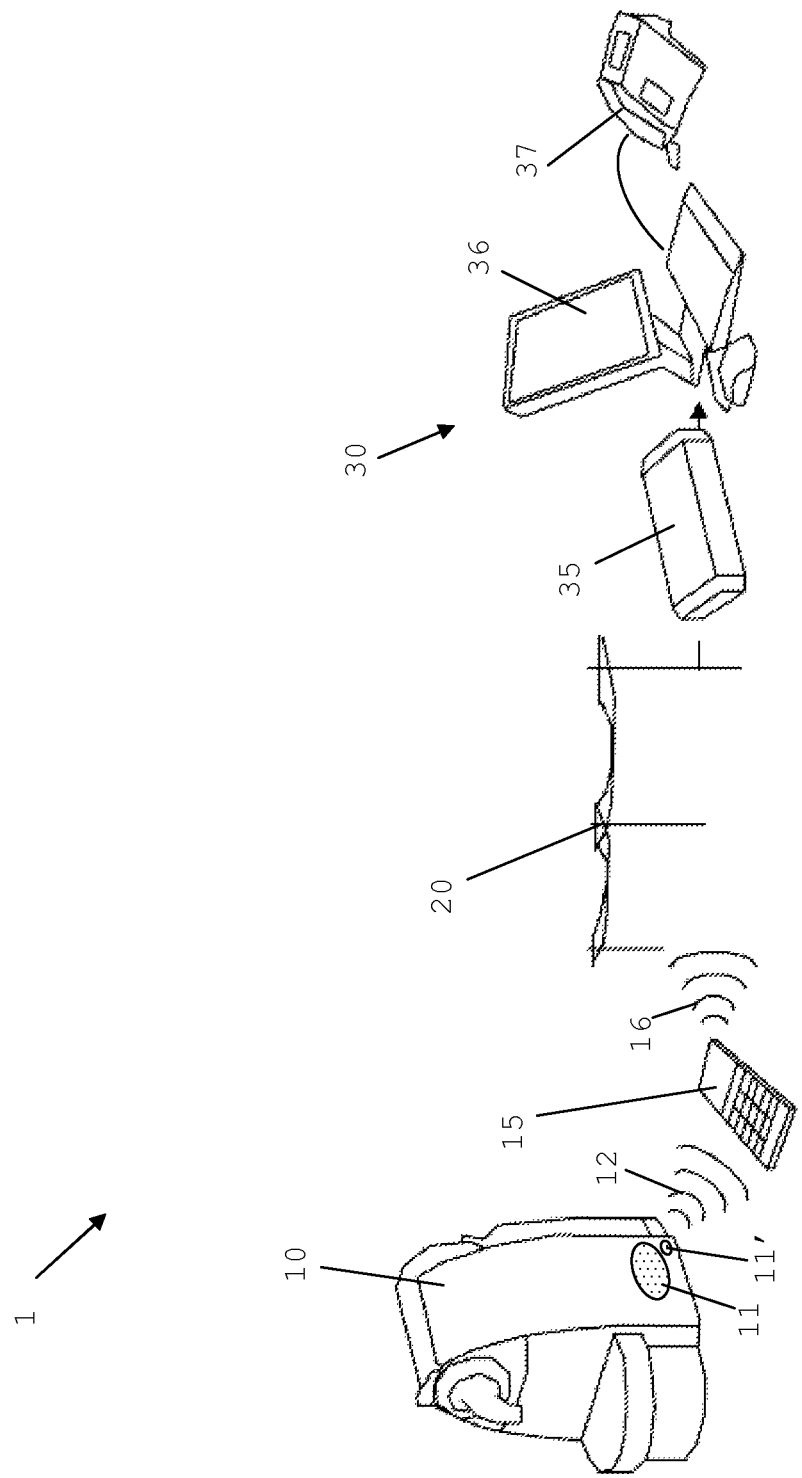

REMOTE DIAGNOSIS OF BEVERAGE PREPARATION MACHINES

CROSS REFERENCE TO RELATED APPLICATIONS

The present application is a National Stage of International Application No. PCT/EP2010/066768, filed on Nov. 4, 2010, which claims priority to European Patent Application No. 09175091.9, filed on Nov. 5, 2009, the entire contents of which are being incorporated herein by reference.

FIELD OF THE INVENTION

The field of the invention pertains in particular to beverage preparation machines that can be monitored from a distance by a service centre.

For the purpose of the present description, a "beverage" is meant to include any liquid food, such as tea, coffee, hot or cold chocolate, milk, soup, baby food, etc. ..... A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee or other beverage machines possess filling means that include a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back therefrom, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 08155851.2, FR 2 624 844, GB 2 397 510, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,731,981, U.S. Pat. No. 5,645,230, U.S. Pat. No. 5,836,236, U.S. Pat. No. 5,959,869, U.S. Pat. No. 6,182,555, U.S. Pat. No. 6,354,341, U.S. Pat. No. 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2009/016490.

One aspect of beverage preparation machines concerns the after sale service and management of machine failures, or like-behaviours from a user perspective. In particular, it is not exceptional that an undesired behaviour of a beverage preparation machine does not result from an actual malfunctioning of the machine but from a previous, unintentional and/or overlooked upsetting of the machine user-settings by the user. For example, by an inappropriate handling of the machine, a user may unconsciously upset the cup size user-setting, from a large size cup to a small size cup or vice versa, and associated the upset setting to a malfunctioning of the machine. What appears to be a malfunctioning of the machine is in fact merely a user-setting problem. The after sale services, i.e. usually the repair services, are then confronted with the handling of such perfectly well functioning machines for the mere sake of changing the undesired user-setting. This, of course, involves a lot of costs that could be easily avoided by properly identifying the issue at the user premises and resetting the machine appropriately.

A solution to this problem lies in a data-communication connection of the beverage preparation machine with a remote service centre, typically via the internet. Hence, an automatic remote diagnosis can be carried out on the machine to differentiate between a true malfunctioning of the machine that requires physical intervention on the machine by the repair and/or maintenance services and a mere user-setting issue that may be dealt with remotely, either by properly instructing the user on the handling of the machine, or even automatically by remote re-setting of the machine via the data-communication connection.

EP 1 302 138 discloses a beverage machine connected to a network. The machine is arranged to communicate with a distant server to carry out diagnosis of the beverage machine and to update the machine's control software via the network. The machine has an interface for connecting a portable memory device, i.e. a USB key, for transporting data from and to a PC connected via the internet to a service centre.

PCT/EP09/058,540 discloses an advanced beverage preparation machine with an ergonomic versatile human-machine interface and a network connection. In an embodiment, the machine has an interface for connection to a data-exchange network.

Even though it has been proposed to connect beverage preparation machines to a network for the purpose of diagnosis or servicing, such a connection requires that a user has access to a network infrastructure, typically the internet, such that the beverage preparation machine can be connected thereto, e.g. via a modem of the machine. This involves a substantial infrastructure and costs that may hardly be justified for all beverage preparation machines.

SUMMARY OF THE INVENTION

A preferred object of the invention relates to a simple remote diagnosis system for beverage preparation machines.

Another preferred object of the invention relates to a simple remote re-setting of an upset beverage preparation machine.

A further preferred object of the invention relates to a simple system to collect accurate information from a beverage preparation machine that belongs to a user calling a service centre.

Yet another preferred object of the invention relates a system for reducing the number beverage preparation machines sent to repair and/or maintenance centers.

Yet a further preferred object of the invention relates to a simple manner to collect general information on the use of beverage preparation machines.

These preferred objects are generally achieved by providing a beverage preparation machine, a service center and a data transmission arrangement therebetween, which transmission arrangement includes a telephone device normally connected to a telephone network. The beverage preparation machine has a communication module arranged to send and/or receive data in a sound format that can be processed and transmitted by the telephone device and telephone network to the service center and be machine-interpreted at the service center. The service center is typically equipped with a device connected to the telephone network, such as a computer, to process automatically the machine-generated data transmitted via the telephone network. Hence, a user calling a service center to get advise on handling his or her beverage preparation machine can be invited orally by the operator or the human-like operator robot of the service center to bring the telephone against the communication module of the beverage preparation machine and let the machine automatically communicate the relevant data to service center and/or receive configuration data from the service center.

Therefore, the invention relates to a communication system comprising: a beverage preparation machine having a data-exchange communication module; a service unit that is distant from the beverage preparation machine and that is arranged for exchanging data with the communication module; and a transmission arrangement for transmitting data between the data-exchange communication module and the service unit.

For instance, the machine is a coffee, tea, chocolate or soup preparation machine. In particular, the machine is arranged for preparing within the ingredient processing arrangement a beverage by passing hot or cold water or another liquid through a capsule containing an ingredient of the beverage to be prepared, such as ground coffee or tea or chocolate or cacao or milk powder.

For example, the preparation machine comprises: a ingredient processing arrangement including one or more of a liquid reservoir, liquid circulation circuit, a heater, a pump and a beverage preparation unit arranged to receive ingredient capsules for extraction and evacuate capsules upon extraction; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550 and in PCT/EP09/053,368.

In accordance with the invention, the data-exchange communication module of the beverage preparation machine comprises a sound-interface for exchanging data as a machine-interpretable sound signal. Moreover, the transmission arrangement comprises a telephone device for transmitting this sound signal of the data towards the service unit and/or originating from the service unit.

Hence, the sound signal representative of the transmitted data should have an encoding in a sound frequency range that is carriable by the normal telephone system.

Another aspect of the invention relates to a beverage preparation machine comprising a data-exchange communication module for exchanging data with a service unit that is distant from the beverage preparation machine. The data-exchange communication module comprises a sound-interface for exchanging data as a sound signal. This sound signal is transmittable via a telephone device for transmitting the sound signal of the data towards the service unit and/or originating from the service unit. Typically, the communication module comprises a loudspeaker and/or a microphone.

Usually, the beverage machine has a control module in data-communication with the data-exchange module. The control module may be arranged to collect and communicate to the data-exchange module data on at least one of: machine information; usage information; error codes; measured data; self-test results; software flags; manipulated user-selectors; and user-settings. The data-exchange module can be arranged to receive data relating to machine setting and communicate such data to the control module for carrying out a machine set up from this service unit.

The communication module may be arranged to generate a control signal before and/or after a transmission. The communication module can be arranged to receive a control signal from this service unit via this telephone device before and/or after a transmission.

This is of particular interest when the telephone communication is not only used to exchange data between the beverage preparation machine and the service unit but also to allow human or hybrid human/artificial communication between the user of the beverage machine and an operator or a human-like operator robot at the service unit. Hence, the service unit and/or the beverage preparation machine may automatically differentiate between human discussions at the level of the user and operator or human-like operator robot, and machine data exchange at the level of the beverage preparation machine and the automatic data processing arrangement at the service unit.

For instance, the telephone line is connected to a computer via a modem at the service centre. This computer is itself connected to a human-like operator robot or a telephone device via which the operator may orally communicate with a user of a beverage preparation machine. When the telephone device at the user's end is brought into sound communication with the communication module of the beverage preparation machine, a control sound signal is generated at the beverage preparation machine and/or at the computer to initiate machine communication. A control sound signal may again be generated to mark the end of the machine communication and give the line back for human communication between the user and the operator or the human-like operator robot. When a human-like operator robot is implemented, the system does not necessitate a telephone device for a human at the service centre. The communication may be completely automated at the service centre side without involving any human operator.

The communication module can be arranged to generate or receive a sound signal encoded with a Dual Tone Multi-Frequency (DTMF) codec or a Frequency Shifting Keying (FSK) codec.

The invention also relates to a service unit that is arranged for exchanging data via a transmission arrangement with a distant communication module of a beverage preparation machine. Such service unit is arranged to receive and/or send data via the transmission arrangement that has a telephone device for transmitting the data as a sound signal to and/or from the communication module. The data transmitted to and from the service unit should be machine interpretable, e.g. in fax signal format.

The service unit typically comprises a computer connected to the transmission arrangement, the computer being arranged for automatically acquiring and processing this data. The computer may be connected via a modem to the transmission arrangement which may be a telephone network. The service unit preferably comprises human-like operator robot or a telephone device for a human operator, the telephone device or human-like operator robot being connected to the transmission arrangement. Hence, the same communication may serve to transmit: a human or hybrid human/artificial conversation between the human operator or human-like operator robot and a user, and a machine-communication between the user's beverage machine and the service unit. The computer of the service unit may be arranged to detect a control signal before and/or after automatically acquiring and processing this data to distinguish between a human conversation and an automatic machine communication. Likewise, the computer can be arranged to generate a control signal for the beverage machine to start transmission of the data via the data-exchange communication module.

Furthermore, the invention relates to a method of communicating data between a beverage preparation machine and a distant service unit via a transmission arrangement, the beverage preparation machine having a communication module to communicate data to the transmission arrangement. The transmission arrangement comprises a telephone device. Moreover, the communication module sends and/or receives this data in the form of a telephone-compatible sound signal to and/or from the telephone device and the distant service unit.

This method may typically be used to carry out a distant automatic diagnosis procedure and/or to report a particular user-setting of the beverage preparation machine to a service unit, in a reliable machine-based manner that does not require any technical analysis of the beverage preparation machine by the user.

To carry out such a distant access to the beverage machine set up, configuration, status, working state, etc. . . . the user does need any particular network set up or proceed to any examination of the beverage preparation machine. A mere telephone device that can be brought sufficiently close to the beverage preparation machine is sufficient for carrying out reliably this type of operation from a service unit in a remote location.

This communication system may also be used for other purposes, for instance to communicate the rate and manner of use of the beverage preparation machine. For example, when the beverage preparation machine uses ingredient capsules, the machine may monitor the capsule consumption, e.g. number, frequency, time of the day, days of the week, etc. . . . and communicate such information to the service unit for survey purposes or for counselling the user accordingly. When the beverage preparation machine is arranged to accept different types of ingredients, in particular in the view of preparing different types of beverages, the consumption of the different ingredients may also be monitored and communicated automatically to the service unit. In the latter case, the beverage preparation machine is preferably arranged to recognise automatically the type of ingredient that is used each time, e.g. by an automatic capsule recognition system as well known in the art of coffee machines using different types of capsules of ground coffee. The gathered information may be used for general commercial purposes, e.g. surveys, or for individual purposes, e.g. advertising tailored for the user in view of the user's behaviour.

In a broader aspect, the principles and features of the inventions described above are not merely applicable within the context of beverage preparation machines, such as coffee or tea machines, but to any household or office machines such as electric kitchen appliances or housecleaning appliances, audio or audio-visual appliances, photocopying machines, etc. . . . . All the features described above and combinations thereof may be applied mutatis mutandis to household or office machines.

BRIEF DESCRIPTION OF THE DRAWINGS

The invention will now be described with reference to FIG. 1 that shows a communication system according to the invention.

DETAILED DESCRIPTION

FIG. 1 schematically illustrates a communication system 1 according to the invention.

System 1 includes a beverage preparation machine 10. For instance, machine 10 is configured to prepare beverages from ingredient capsules, as for example known in the field of coffee machines. Examples of such beverage preparation configurations are disclosed in EP 2 070 454, WO 2006/063645 and WO 2008/138710.

Machine 10 includes an incorporated data-exchange communication module. This module has a sound interface 11,11' for exchanging the data as a sound signal. Such an interface comprises a loudspeaker 11 and microphone 11'.

Machine 10 further includes an internal control module in data-communication with the data-exchange module. The control module typically has a PCB with a controller and connections for sensors, user-interface, power supply, electric control lines, etc. . . . for instance as disclosed in WO 2009/043865. The control module is arranged to collect and communicate to the data-exchange module data on at least one of: machine information; usage information; error codes; measured data; self-test results; software flags; manipulated user-selectors; and user-settings.

Communication system 1 further includes a telephone network 20 connecting machine 10 to a remote service centre 30. Beverage machine 10 is in data-communication with telephone network 20 via the user's telephone device 15. Such device 15 may be a wireless telephone or a mobile phone having a radio-connection 16 with telephone network 20. Beverage machine 10 communicates with device 15 via its loudspeaker 11 and microphone 11'.

Service centre 30 includes a personal computer 36 connected to network 20 via a modem 35. An operator telephone device 37 is connected to computer 36 to allow communication between an operator and a user using his or her telephone device 15.

The user's telephone device may be used to request the telephone network 20 to establish a call session between the telephone device and the service center 30. Alternatively, said call session may be established upon request of the service center 30. Once the call session is established, two types of data may be exchanged for the duration of the same call session: machine related data encoded by the data-exchange communication module as a sound signal and voice data. Typically, the voice data relates to the oral communications between an operator and the user of the telephone device 15.

In an embodiment, the voice data and the machine related data are transmitted sequentially. To this end for example it is possible to arrange time intervals reserved for the transmission of the voice data, and other non interleaving time intervals for machine related data. This reservation scheme may be materialized to the user by the use of sound signalisation indicating the beginning and/or the end of the different time intervals. For example, a "bip" signal may be used to mark the beginning of a time interval reserved to machine related data transmission.

In another embodiment, the data-exchange communication module and the service centre 30 comprise a multiplexer/demultiplexer allowing automatically to transmit the voice data and the machine related data during the same call session. The multiplexer/demultiplexer may be based on a suitable algorithm adapted to transmit the voice data and the machine related data transparently for the user and/or the operator. This algorithm may be for example time-based, code-based, frequency-based and/or spatial-based.

In practice, when a user experiences difficulties with beverage preparation machine 10, he or she will call service centre 30 for advice using the regular telephone device 15. An operator will pick up operator phone device 37 to guide the user in the diagnosis procedure. For instance, the operator will invite the user to place telephone device 15 close to loudspeaker 11 and microphone 11' of beverage preparation machine 10. Once telephone device 15 is in place next to beverage preparation machine 10, the operator may initiate the machine data transmission. For example, computer 36 will generate a control signal via modem 35 that will be transmitted to microphone 11' of beverage preparation machine 10. The communication module of machine 10 will thus pick up the control signal, in the form of a sound signal, and transmit the control signal as an electric signal to the control module of machine 10. Upon receiving this control signal, control module will transmit to the communication module all user-settings, error messages and measured values by the machine's sensors to the communication module and then to computer 36 via telephone device 15, telephone network 20 and modem 35. Data transmission from loudspeaker 11 of communication module of machine 10 to telephone device 15 is carried out in the form of a sound signal, e.g. a fax transmission sound format. From telephone device 15 to telephone network 20, the data is transmitted as a radio signal 16. Along network, over modem 35 to computer 36, the data is transmitted as an electric signal.

Beverage machine 10 will generate a control signal emitted as a sound signal from loudspeaker 11 communicated to computer 36 to indicate the end of the transmission. The termination of the call session is independent of the completion of the data transmission. Computer 36 with provide a corresponding message to invite the human operator (or, the case being, a human-like operator robot) to resume human communication via telephone device 37.

In a variation, wireless telephone device 15 may be replaced by a wired telephone device. In this case, the telephone device should be based close to beverage preparation machine 10.

Personal computer 36 will automatically process the data received from beverage preparation machine 10 for diagnosis purposes. If a machine failure is identified by computer 36, the user will be invited by the operator to take the necessary steps for maintenance and/or repairing of the machine, for instance by sending the machine to an after sale service. If the machine has to be reset or differently set up, e.g. because of an upsetting by a user, the operator may either guide the user on how to properly set up beverage machine 10 or may arrange it via computer 36 after the user has put back telephone device 15 close to machine 10 for an automatic distant resetting via the telephone system 15,20,35.

Hence, beverage machine's which are merely upset and not malfunctioning do not need to be sent back to a maintenance and/or repair service but may be reconfigured via telephone directly on the user's premises. This saves a lot of costs and avoids unnecessary removal of the beverage preparation machine from the user's premises.

Moreover, during the same call session, the voice data and machine related data may be exchanged. It allows the user to explain orally, to an operator of the service center, its issue with the machine, and in the same time transmit data or control the machine remotely. It avoids having to establish separate call sessions or having a data dedicated session. Consequently it allows reducing the complexity of the diagnostic and support process, and improving the fluidity of the exchanges between the operator and the user.

The invention claimed is:

1. A communication system comprising:
   a beverage preparation machine having a data-exchange communication module;
   a service unit that is separate from the beverage preparation machine and that is arranged for exchanging data with the data-exchange communication module of the beverage preparation machine;
   a transmission arrangement for transmitting data between the data-exchange communication module and the service unit,
   the data-exchange communication module of the beverage preparation machine comprises a sound-interface for exchanging data as a sound signal;
   the transmission arrangement comprises a telephone device for transmitting the sound signal of the data towards the service unit and/or originating from the service unit;
   the data-exchange communication module performs an operation selected from the group consisting of generating a control signal before a transmission of the sound signal, generating a control signal after a transmission of the sound signal, receiving a control signal from the service unit through the telephone device before a transmission of the sound signal, and receiving a control signal from the service unit through the telephone device after a transmission of the sound signal; and
   at least one of the service unit or the beverage preparation machine uses information provided by the control signal to automatically differentiate between human discussions and machine data exchange.

2. The system of claim 1, wherein the data-exchange communication module does not comprise a modem.

3. The system of claim 1, wherein the beverage preparation machine is arranged to accept different types of capsules, automatically determines the type of capsule that is used, and transmits consumption data regarding the types of capsules used to the service unit.

4. A beverage preparation machine comprising a data-exchange communication module for exchanging data with a service unit that is separate from the beverage preparation machine:
   the data-exchange communication module comprises a sound-interface for exchanging data as a sound signal;
   the sound signal is transmittable via a telephone device for transmitting the sound signal of the data towards the service unit and/or originating from the service unit;
   the data-exchange communication module performs an operation selected from the group consisting of generating a control signal before a transmission of the sound signal, generating a control signal after a transmission of the sound signal, receiving a control signal from the service unit through the telephone device before a transmission of the sound signal, and receiving a control signal from the service unit through the telephone device after a transmission of the sound signal; and
   at least one of the service unit or the beverage preparation machine uses information provided by the control signal to automatically differentiate between human discussions and machine data exchange.

5. The machine of claim 4, wherein the data-exchange communication module comprises a loudspeaker and/or a microphone.

6. The machine of claim 4, comprising a control module in data-communication with the data-exchange communication module, the control module collecting and communicating, to the data-exchange communication module, data on at least one characteristic selected from the group consisting of: machine information; usage information; error codes; measured data; self-test results; software flags; manipulated user-selectors; and user-settings.

7. The machine of claim 6, wherein the data-exchange communication module receives data relating to machine setting and communicates such data to the control module for carrying out a machine set up remotely from the service unit.

8. The machine of claim 4, wherein the data-exchange communication module generates the control signal before and/or after the transmission of the sound signal.

9. The machine of claim 4, wherein the data-exchange communication module generates a sound signal encoded with a Dual Tone Multi-Frequency (DTMF) codec or a Frequency Shifting Keying (FSK) codec.

10. The machine of claim 4, wherein the data-exchange communication module receives the control signal from the service unit via the telephone device before and/or after the transmission.

11. A service unit for exchanging data via a transmission arrangement with a separate data-exchange communication module of a beverage preparation machine,
wherein the service unit is arranged to receive and/or send data via the transmission arrangement that has a telephone device for transmitting the data as a sound signal to and/or from the data-exchange communication module;
the data-exchange communication module performs an operation selected from the group consisting of generating a control signal before a transmission of the sound signal, generating a control signal after a transmission of the sound signal, receiving a control signal from the service unit through the telephone device before a transmission of the sound signal, and receiving a control signal from the service unit through the telephone device after a transmission of the sound signal; and
at least one of the service unit or the beverage preparation machine uses information provided by the control signal to automatically differentiate between human discussions and machine data exchange.

12. The service unit of claim 11, comprising a computer connected to the transmission arrangement, the computer automatically acquiring and processing the data.

13. The service unit of claim 12, comprising a human-like operator robot or a telephone device for a human operator, the human-like operator robot or telephone device being connected to the transmission arrangement.

14. The service unit of claim 13, wherein the computer detects the control signal before and/or after automatically acquiring and processing said data.

15. The service unit of claim 13, wherein the computer generates the control signal for the beverage machine to start transmission of the data via the data-exchange communication module.

16. A method of communicating data between a beverage preparation machine and a separate service unit via a transmission arrangement, the beverage preparation machine having a data-exchange communication module communicating data to the transmission arrangement,
the transmission arrangement comprises a telephone device and the data-exchange communication module sends and/or receives the data in the form of a telephone-compatible sound signal to and/or from the telephone device and the service unit;
the data-exchange communication module performs an operation selected from the group consisting of generating a control signal before a transmission of the sound signal, generating a control signal after a transmission of the sound signal, receiving a control signal from the service unit through the telephone device before a transmission of the sound signal, and receiving control signal from the service unit through the telephone device after a transmission of the sound signal; and
at least one of the service unit or the beverage preparation machine uses information provided by the control signal to automatically differentiate between human discussions and machine data exchange.

17. A communication system comprising:
a household or office machine;
a service unit that is separate from the household or office machine and exchanges data with a data-exchange communication module of the household or office machine;
a transmission arrangement for transmitting data between the data-exchange communication module and the service unit,
the data-exchange communication module of the household or office machine comprises a sound-interface for exchanging data as a sound signal; and
the transmission arrangement comprises a telephone device for transmitting the sound signal of the data towards the service unit and/or originating from the service unit;
the data-exchange communication module performs an operation selected from the group consisting of generating a control signal before a transmission of the sound signal, generating a control signal after a transmission of the sound signal, receiving a control signal from the service unit through the telephone device before a transmission of the sound signal, and receiving a control signal from the service unit through the telephone device after a transmission of the sound signal; and
at least one of the service unit or the household or office machine uses information provided by the control signal to automatically differentiate between human discussions and machine data exchange.

18. A household or office machine for exchanging data with a service unit that is separate from the household or office machine, the household or office machine comprising:
a data-exchange communication module that comprises a sound-interface for exchanging data as a sound signal;
the sound signal is transmittable via a telephone device for transmitting the sound signal of the data towards the service unit and/or originating from said service unit;
the data-exchange communication module performs an operation selected from the group consisting of generating a control signal before a transmission of the sound signal, generating a control signal after a transmission of the sound signal, receiving a control signal from the service unit through the telephone device before a transmission of the sound signal, and receiving a control signal from the service unit through the telephone device after a transmission of the sound signal; and
at least one of the service unit or the household or office machine uses information provided by the control signal to automatically differentiate between human discussions and machine data exchange.

19. A service unit for exchanging data via a transmission arrangement with a separate data-exchange communication module of a household or office machine wherein the service unit receives and/or sends data via the transmission arrangement that has a telephone device for transmitting the data as a sound signal to and/or from the data-exchange communication module;

the data-exchange communication module performs an operation selected from the group consisting of generating a control signal before a transmission of the sound signal, generating a control signal after a transmission of the sound signal, receiving a control signal from the service unit through the telephone device before a transmission of the sound signal, and receiving a control signal from the service unit through the telephone device after a transmission of the sound signal; and at least one of the service unit or the household or office machine uses information provided by the control signal to automatically differentiate between human discussions and machine data exchange.

* * * * *